E. J. OGDEN.
TRACTION WHEEL FOR PLANTERS.
APPLICATION FILED JUNE 25, 1913.

1,087,816.

Patented Feb. 17, 1914.

WITNESSES

INVENTOR
EDMUND J. OGDEN
BY
ATTORNEYS

UNITED STATES PATENT OFFICE.

EDMUND J. OGDEN, OF SPRINGFIELD, ILLINOIS.

TRACTION-WHEEL FOR PLANTERS.

1,087,816.  Specification of Letters Patent.  Patented Feb. 17, 1914.

Original application filed December 5, 1911, Serial No. 664,000. Divided and this application filed June 25, 1913. Serial No. 775,657.

*To all whom it may concern:*

Be it known that I, EDMUND J. OGDEN, a citizen of the United States, and a resident of Springfield, in the county of Sangamon and State of Illinois, have invented certain new and useful Improvements in Traction-Wheels for Planters, of which the following is a specification.

The application is a division of the application Serial No. 664,000, filed December 5, 1911, patented Nov. 25, 1913, No. 1,079,797, and the invention relates to traction wheels for corn and other planters.

The object of the invention is to provide a traction wheel which will straddle the hills of corn or other seed.

A further object of the invention is to provide a wheel with means which will effectually prevent it from slipping.

The invention consists in the construction and arrangements of parts as hereinafter described and pointed out in the claim.

Reference is had to the accompanying drawing forming a part of this specification in which similar characters of reference indicate corresponding parts in all of the views.

Figure 1:
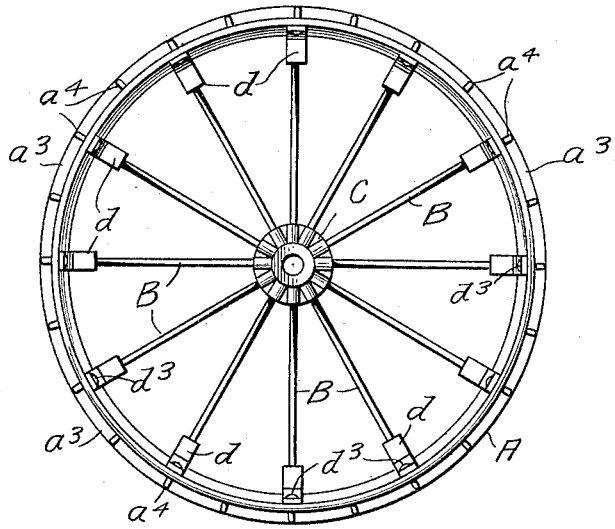
Figure 2:
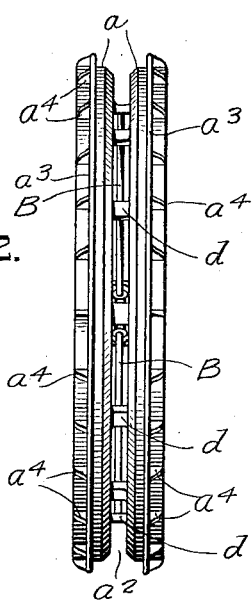
Figure 3:
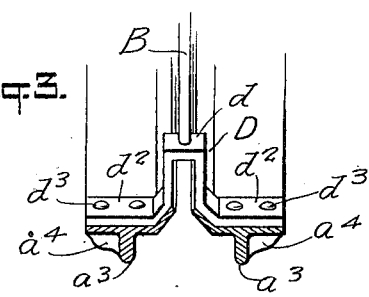

Figure 1 is a side elevation of my improved wheel; Fig. 2 is an edge view of the same; and Fig. 3 is a detail cross sectional view.

Referring to the drawing, A is the rim, B the spokes and C the hub of the wheel. The rim A is formed of the two members $a$ $a$ having inwardly inclined inner edges and spaced apart, the members being connected together by the brackets D so as to form an opening $a^2$ between the said members. The brackets D each consists of an inverted approximately U-shaped body $d$ having laterally extending angular flanges $d^2$ at the ends of the members of the body. The flanges $d^2$ of the brackets fit upon and are secured by bolts $d^3$ to the inner faces of the members of the rim so that the body portions $d$ of the brackets will be opposite the opening $a^2$ between the members of the rim and to the said body portions of the brackets, the spokes B are secured.

Each member $a$ of the rim is provided on its outer face with an annular rib $a^3$ and with a plurality of laterally extending triangular lugs $a^4$ between the rib and the outer side of the member.

By constructing the wheel with a rim formed of two members spaced apart the wheel will straddle the hills of corn or other seed deposited by the planter and by providing each member of the rim with an annular rib and a plurality of lugs the wheel will be effectually prevented from slipping, when the planter is drawn over level or rolling ground. The ribs $a^3$ offer a bearing for the wheels when drawn over solid ground, the lugs at this time being out of engagement with the ground.

I claim:

A traction wheel, comprising a hub, spokes, a rim formed of two members having inwardly inclined inner edges and spaced apart, each member being provided with an annular rib and triangular lugs between the rib and the outer side of the member, brackets connecting the members of the rim together, said brackets having inverted approximately U-shaped portions opposite the space between the members and provided with angular flanges fitting upon and secured to the inner faces of the members, and spokes secured to the said U-shaped portions of the said brackets.

EDMUND J. OGDEN.

Witnesses:
B. GALLIGAN,
E. L. WEEKS.

Copies of this patent may be obtained for five cents each, by addressing the "Commissioner of Patents, Washington, D. C."